US006683150B1

(12) United States Patent
Meverden et al.

(10) Patent No.: US 6,683,150 B1
(45) Date of Patent: Jan. 27, 2004

(54) HIGH MOLECULAR WEIGHT POLYPROPYLENE PROCESS

(75) Inventors: Craig C. Meverden, Mason, OH (US); Sandor Nagy, Naperville, IL (US); Barbara M. Tsuie, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/324,539

(22) Filed: Dec. 19, 2002

(51) Int. Cl.[7] .......................... C08F 110/06; C08F 4/64; C08F 4/602
(52) U.S. Cl. .................. 526/351; 526/160; 526/165; 526/161; 526/172
(58) Field of Search ................ 526/351, 160, 526/165, 161, 172

(56) References Cited

U.S. PATENT DOCUMENTS

| 5,596,052 A | 1/1997 | Resconi et al. ............. 526/127 |
| 5,945,496 A | 8/1999 | Resconi et al. ............. 526/351 |
| 6,232,260 B1 | 5/2001 | Nagy et al. ................. 502/155 |
| 6,440,889 B1 | 8/2002 | Tsuie ......................... 502/152 |
| 6,451,724 B1 * | 9/2002 | Nifant'ev et al. |
| 6,541,583 B2 * | 4/2003 | Meverden et al. |

FOREIGN PATENT DOCUMENTS

| WO | WO 99/24446 | 5/1999 |
| WO | WO 99/52950 | 10/1999 |
| WO | WO 99/52955 | 10/1999 |
| WO | WO 01/53360 | 7/2001 |

OTHER PUBLICATIONS

*Macromol. Rapid Commun. 20*, 284–288 (1999).
*Organometallics 19*, 3767–3775 (2000).
*J. Am. Chem. Soc. 121*, 4348–4355 (1999).
*Macromolecules 35*, 5742–5743 (2002).
*Organometallics 15*, 998–1005 (1996).
*Macromol. Chem. Phys. 202*, 2010–2028 (2001).
*Macromolecules 8*, 687 (1975).
*Macromolecules 6*, 925 (1973).
G. Odian, *Principles of Polymerization*, 2nd edition, pp. 568–580 (1981).
Buu–Hoi and Xuong, *J. Chem. Soc.* (1952) 2225.

* cited by examiner

*Primary Examiner*—Caixia Lu
(74) *Attorney, Agent, or Firm*—John Tyrell; Jonathan L. Schuchardt

(57) ABSTRACT

A propylene polymerization process is disclosed. The process uses a fluorenyl-indenoindolyl catalyst precursor in the presence of an activator to obtain high molecular weight polypropylene with low degrees of isotacticity and syndiotacticity. In particular, the polypropylene has tacticity such that mmmm is 0–20% and rrrr is 0–60%.

20 Claims, No Drawings

HIGH MOLECULAR WEIGHT POLYPROPYLENE PROCESS

FIELD OF THE INVENTION

This invention relates to a process for polymerizing propylene with a fluorenyl-indenoindolyl catalyst precursor in the presence of an activator to obtain high molecular weight polypropylene with little or no isotacticity and low levels of syndiotacticity.

BACKGROUND OF THE INVENTION

Polymers of propylene are well known and are characterized by their molecular weight and by the stereoregularity of the monomer units. By "stereoregularity," we mean whether the recurring units are present in the isotactic, syndiotactic or atactic configuration. These features affect polymer processability and physical properties. Dependent upon the end use application, different properties are desirable.

Catalyst precursors that incorporate a transition metal and an indenoindolyl ligand are known. U.S. Pat. No. 6,232,260 discloses the use of transition metal catalysts based upon indenoindolyl ligands. There is no indication of stereochemical control. Pending application Ser. No. 09/859,332, filed May 17, 2001, discloses a process for the polymerization of propylene in the presence of a Group 3–5 transition metal catalyst that has two non-bridged indenoindolyl ligands wherein the resulting polypropylene has isotactic and atactic stereoblock sequences. Pending application Ser. No. 10/123,774, filed Apr. 16, 2002, discloses a process for the polymerization of ethylene in the presence of a Group 3–10 transition metal catalyst that has two bridged indenoindolyl ligands.

Propylene polymerizations using fluorenyl-cyclopentadienyl and fluorenyl-indenyl catalysts were reported in *Macromol. Rapid Commun.* 20, 284–288 (1999) to give polymers with several different tacticities including some within the desired range. However, the tacticity varied widely with polymerization temperature and no indication of polymer molecular weight was given.

Propylene polymerizations using fluorenyl-indenyl catalysts were reported in *Organometallics* 19 3767–3775 (2000) and references cited therein to make a broad range of tacticities. They report that 2-methyl group and 5,6-substitution on the indenyl ligand are necessary requirements to obtain a high enough molecular weight. With these substituents, the level of mmmm pentads was greater than 25%. Without these substituents, they reported one catalyst precursor that gave a lower amount of mmmm pentads, but the highest reported $M_w$ was 83,000. *J. Am. Chem. Soc.* 121 4348–4355 (1999) gives results for twelve polymerizations with a 2-methyl-5,6-cyclopentyl substituted complex; the amount of mmmm pentads varied from 20 to 72% dependent upon the polymerization temperatures with the amount generally increasing with increasing polymerization temperature. This system was also studied in WO 99/52950 and WO 99/52955 and polymers with mmmm pentads between 25–60% were disclosed. *Macromolecules* 35 5742–5743 (2002) studied both the zirconium and hafnium catalysts and reported some advantages using borate activators. However, for any polymerizations done at 20° C. or higher, the amount of mmmm pentads varied from 24–54%.

A bis-fluorenyl catalyst system has been reported in *Organometallics* 15 998–1005 (1996) and U.S. Pat. Nos. 5,596,052 and 5,945,496 to give high molecular weight polypropylene, but the pentads were not reported. A subsequent publication by many of the same authors, *Macromol. Chem. Phys.* 202 2010–2028 (2001) indicated that the level of mmmm pentads was about 2%. This subsequent paper reported work done with substituted bis-indenyl systems. A bis-isopropylindenyl system with three different bridging groups is disclosed. One gave a very low $M_w$ of 9600 and no tacticity was reported. For the other two polymers, one had 15.6% mmmm pentads and the other 25.5%.

Despite the considerable work done in this area, there are very few processes known to produce high molecular weight, low tacticity polypropylene. All processes behave differently and there is often a tradeoff in useful temperature range, activity, polymer properties or process robustness. Therefore, there is a need for a good process to prepare polypropylene with all three of the desired features. Polypropylene with all three features, namely high molecular weight, low isotacticity and low syndiotacticity should have improved properties such as improved transparency, improved flexibility and improved elastic properties.

SUMMARY OF THE INVENTION

The invention is a process to polymerize propylene to give a polymer with high molecular weight and low degrees of isotacticity and syndiotacticity. In particular, the polypropylene has tacticity such that mmmm is 0–20% and rrrr is 0–60%. If a polymer is completely isotactic, it can be too stiff for many applications. The high molecular weight improves strength and mechanical properties. The combination of all three features should give improved mechanical properties, toughness, strength and thermal properties.

The polymerization process is done in the presence of an activator and a fluorenyl-indenoindolyl catalyst precursor.

DETAILED DESCRIPTION OF THE INVENTION

The tacticity of a polymer affects its properties. The term "tacticity" refers to the stereochemical configuration of the polymer. For example, adjacent monomer units can have either like or opposite configuration. If all monomer units have like configuration, the polymer is "isotactic." If adjacent monomer units have opposite configuration and this alternating configuration continues along the entire polymer chain, the polymer is "syndiotactic." If the configuration of monomer units is random, the polymer is "atactic." When two contiguous monomer units, a "diad," have the same configuration, the diad is called isotactic or "meso" (m). When the monomer units have opposite configuration, the diad is called "racemic" (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. For five contiguous monomer units, a "pentad," there are ten possibilities. They are mmmm, mmmr, rmmr, mmrr, mrmm, rmrr, mrmr, rrrrr rrrr, and mrrm. A completely syndiotactic polymer would have all rrrr pentads while a completely isotactic polymer would have all mmmm pentads. The configuration can be determined by $^{13}C$ nuclear magnetic resonance spectroscopy as described in *Macromolecules* 8 687 (1975) and in *Macromolecules* 6 925 (1973) and references cited therein. For more information on polymer stereochemistry, see G. Odian, *Principles of Polymerization*, $2^{nd}$ edition, pages 568–580 (1981).

The configuration of the monomer units affects the polymer properties. For example, highly isotactic polypropylene readily forms a crystalline structure and has excellent chemical and heat resistance. The polypropylene made by the process of the invention is characterized in that it has low levels of isotacticity and low levels of syndiotacticity. By low levels of isotacticity, we mean the percent of pentads having mmmm configuration is less than 20%, preferably more than 2% and less than 10%. By low levels of syndiotacticity, we mean the percent of pentads having rrrr is less than 60%, preferably more than 10% and less than 25%. Because of the low levels of syndiotacticity and isotacticity, the polymer is predominantly or even completely amorphous and generally has no melting point. It is transparent, flexible and has good elastic properties.

The polymer has high molecular weight. By high molecular weight, we mean the weight average ($M_w$) molecular weight is greater than 65,000 and preferably greater than 100,000. The $M_w$ can be measured by gel permeation chromatography and affects polymer properties such as elasticity. Generally, the elastic properties such as tensile set and stress recovery improve with increasing molecular weight.

The polymer is prepared by polymerizing propylene in the presence of an activator and a fluorenyl-indenoindolyl catalyst precursor. The preferred catalyst has a fluorenyl ligand bridged to an indenoindolyl ligand. An indenoindolyl ligand derives from an indenoindole compound. By "indenoindole compound," we mean an organic compound that has both indole and indene rings. The five-membered rings from each are fused, i.e., they share two carbon atoms.

The catalyst precursor preferably has the general structure:

where M is a Group 3–10 transition metal. Preferably, M is a Group 3–5 transition metal and more preferably M is zirconium. $L_1$ is an indenoindolyl ligand and $L_2$ is a fluorenyl ligand. Preferably, $L_1$ and $L_2$ are bridged to each other through a divalent radical. L is a ligand and is preferably selected from the group consisting of halogen, alkoxy, aryloxy, siloxy, dialkylamino, diarylamino, and hydrocarbyl groups. Labile ligands such as halogen are particularly preferred. X is an integer that satisfies the valence of M.

More preferably, the catalyst precursor has the structure:

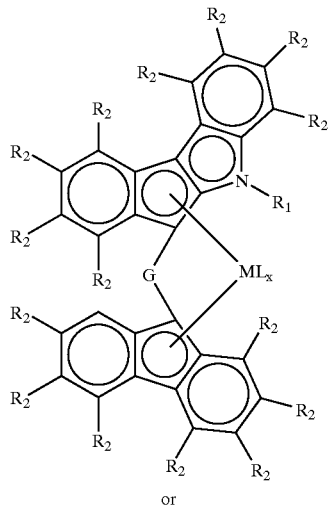

or

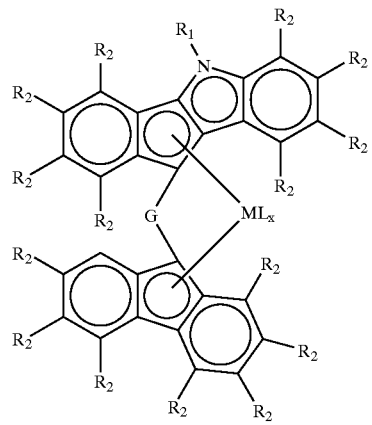

in which $R_1$ is selected from the group consisting of $C_1$–$C_{30}$ hydrocarbyl, $C_1$–$C_6$ halocarbyl, $C_1$–$C_{30}$ halohydrocarbyl and trialkylsilyl; each $R_2$ is independently selected from the group consisting of $R_1$, H, F, Cl, Br and $C_1$–$C_6$ alkoxy; G is a divalent radical selected from the group consisting of hydrocarbyl and heteroatom containing alkylene radicals, diorgano silyl radicals, diorgano germanium radicals and diorgano tin radicals; M is a Group 3 to 10 transition metal; each L is independently selected from the group consisting of halide, alkoxy, siloxy, alkylamino, and $C_1$–$C_{30}$ hydrocarbyl and x satisfies the valence of M.

Methods for making indenoindole compounds are well known. Suitable methods and compounds are disclosed, for example, in U.S. Pat. Nos. 6,232,260 and 6,440,889, the teachings of which are incorporated herein by reference, and references cited therein, including the method of is Buu-Hoi and Xuong, J. Chem. Soc. (1952) 2225. Suitable procedures also appear in PCT Int. Appls. WO 99/24446 and WO 01/53360.

The complexes can be made by any suitable method; those skilled in the art will recognize a variety of acceptable synthetic strategies. See especially PCT Int. Appl. WO 01/53360 for suitable routes. Often, the synthesis begins with preparation of the desired indenoindole compound from particular indanone and arylhydrazine precursors. In one convenient approach, the indenoindole is deprotonated and reacted with a substituted fluorenyl compound to attach the fluorenyl compound through a bridging group. Another strategy employs the reaction of a fluorenyl anion with a substituted indenoindole compound. In both syntheses, the resultant fluorenyl group bridged to the indenoindole group can then be reacted with two equivalents of a strong base to form the dianion. Reaction of the dianion with a suitable metal compound affords the catalyst precursor. Any convenient source of the transition metal can be used to make the catalyst precursor. The transition metal source conveniently has labile ligands such as halide or dialkylamino groups that can be easily replaced by the dianion of the bridged fluorenyl-indenoindolyl ligand. Examples are halides (e.g., $TiCl_4$, $ZrCl_4$), alkoxides, amides, and the like.

The catalyst precursor is activated. Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutylaluminum, lithium tetrakis(pentafluorophenyl) borate, lithium tetrakis(pentafluorophenyl)aluminate, dimethylanilinium tetrakis(pentafluorophenyl)borate, trityl tetrakis(pentafluorophenyl)borate, tris(pentafluorophenyl)

borane, triphenylborane, tri-n-octylborane, the like, and mixtures thereof.

Selection of activator depends on many factors including the catalyst precursor used and the desired polymer properties. In one preferred embodiment, the catalyst precursor is premixed with a solution of the activator prior to addition to the reactor. Preferably, the catalyst precursor and activator solution are premixed for a period of time between ten minutes and two hours. When the catalyst precursor is premixed with a solution of the activator, it is preferable to use a portion of the activator and to add the remainder of the activator to the reactor prior to the addition of the premix. In this embodiment, preferably an alkyl aluminum compound is added to the reactor prior to the addition of the premix.

Optionally, the catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene.

Many types of polymerization processes can be used. The process can be practiced in the gas phase, bulk, solution, or slurry. The polymerization can be performed over a wide temperature range. Generally, lower temperatures give higher molecular weight and longer catalyst lifetimes. However, since the polymerization is exothermic, lower temperatures are more difficult and costly to achieve. A balance must be struck between these two factors. Preferably, the temperature is within the range of about 0° C. to about 150° C. A more preferred range is from about 20° C. to about 70° C.

The catalyst activity can vary based upon the structure of the catalyst precursor, the polymerization temperature and impurities that may be present in the reactor. Generally, the higher the activity the better since poor activity results in more catalyst precursor being needed which increases cost and increases the amount of residual transition metal in the polypropylene. Preferably, the activity will be more than 100 kg polypropylene per gram transition metal per hour. More preferably, the activity will be more than 200 kg and most preferably, more than 400 kg polypropylene per gram transition metal per hour.

The unique structure of these polymers makes them excellent blend components. The high molecular weight and low tacticity should give blends with enhanced properties such as improved flexibility and elastic properties. The polymers can be blended with any of several addition or condensation polymers or copolymers such as polypropylene, polystyrene, polyvinyl alcohol, polyvinyl chloride, EPDM, polyamides or polycarbonate. Preferably, the blend is with polyolefins such polypropylene, polyethylene or LLDPE. Of these, a preferred blend is with polypropylene and a particularly preferred blend is with isotactic polypropylene.

The following examples merely illustrate the invention. Those skilled in the art will recognize many variations that are within the spirit of the invention and scope of the claims.

EXAMPLE 1

6-[1,1-Dimethyl-1-(fluorenyl)silyl]-5,6-dihydrido-2,5-dimethyl Indeno[2,1-b]indolylzirconium Dichloride 1-7

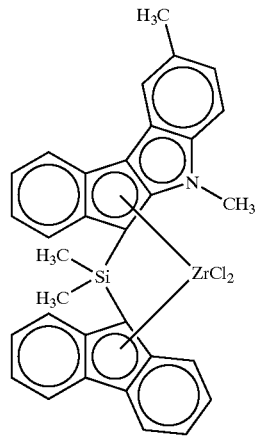

(a) Preparation of 9-(chlorodimethylsilyl)fluorene 1-1. A 1-L flask with stir bar was charged with fluorene (24.0 g, 144.0 mmol) and diethylether (400 mL). The mixture was cooled to 0° C., and n-butyllithium (90.0 mL, 2.5 M in hexanes, 225.0 mmol) was added dropwise. The solution turned orange and was allowed to warm to room temperature overnight. A solution of dimethylsilyldichloride (210.0 mL, 1.73 mol) in diethylether (100 mL) was cooled to 0° C., and the fluorenyl anion was added dropwise. A precipitate formed immediately, and the mixture was stirred for 24 hours and filtered. The volatiles were removed under reduced pressure, and the residue was washed with hexanes (100 mL) and filtered. The white solid was collected and dried under vacuum. A second crop was isolated from the hexanes wash (combined yield 28.7 g, 76.8%).

(b) Preparation of 5,6-dihydrido-2-methyl-indeno[2,1-b] indole 1-2. A 1-L 3-neck flask equipped with mechanical stirrer, reflux condenser, and glass stopper was charged with 2-indanone (51.0 g, 0.39 mol) and p-tolylhydrazine hydrochloride (61.4 g, 0.39 mol). Glacial acetic acid (525 mL) was added at room temperature, and the mixture was vigorously stirred and heated to reflux. The mixture turned red, and was heated for 2 hours, cooled to room temperature, and was poured into ice water (1 L). The precipitate was filtered to afford a solid, which was washed with water (approximately 1 L). The solid was dissolved in ethyl acetate (1.4 L), and activated charcoal was added and gently warmed. The mixture was cooled and filtered over a pad of Celite. The filtrate was dried over sodium sulfate and filtered and was concentrated to 450 mL and cooled to −30° C. for 3 days. The crystalline solid was filtered and washed with chilled (−78° C.) hexanes (2×500 mL), and the beige solid was collected and dried under vacuum (47.1 g, 55.6%).

(c) Preparation of 5,6-dihydrido-2,5-dimethyl-indeno[2,1-b]indole 1-3. A 500-mL 3-neck flask equipped with mechanical stirrer, dropping additional funnel, and reflux condenser was charged with a solution of sodium hydroxide (42 mL, 21.5 M, 903 mmol) followed by hexadecyltrimethyl ammonium bromide (0.36 g, 0.97 mmol). The product 1-2

(15.0 g, 68.4 mmol) was added under vigorous stir followed by toluene (50 mL). A solution of methyl iodide (8.0 mL, 128.5 mmol) in toluene (15 mL) was added dropwise at room temperature, and the mixture was stirred at room temperature for 2.5 hours and at reflux for an hour. The mixture turned red and was cooled to room temperature and filtered. The crystalline solid was washed with chilled (−30° C.) ethanol (200 mL) followed by chilled hexanes (200 mL) to afford a pale red solid (10.3 g, 64.6%).

(d) Preparation of 5,6-dihydrido-2,5-dimethyl-indeno[2,1-b]indol-6-yllithium 1-4. A 250-mL flask with stir bar was charged with 1-3 (4.94 g, 21.1 mmol) and toluene (125 mL) was added to make a suspension. n-Butyllithium (13.0 mL, 2.5 M in hexanes, 32.5 mmol) was added at room temperature, and the solid dissolved. The mixture was maintained at room temperature and turned pale yellow, and a precipitate formed after 2 hours. The mixture was maintained for 2 days and filtered to afford a pale beige solid, which was washed with toluene (60 mL) followed by hexanes (30 mL). The solid was collected and dried under vacuum (4.37 g, 86.5%).

(e) Preparation of 6-[1,1-dimethyl-1-(fluorenyl)silyl]-5,6-dihydrido-2,5-dimethyl-indeno[2,1-b]indole 1-5. A 500-mL flask with stir bar was charged with 1-1 (4.32 g, 16.7 mmol) and diethylether (120 mL). Anion 1-4 (3.99 g, 16.7 mmol) was taken up in toluene (80 mL) and diethylether (30 mL) was added slowly to afford an orange solution, which was added dropwise to 1-1. The mixture turned cloudy and was stirred for 24 hours and filtered. The solid was extracted with methylene chloride and $^1$H NMR analysis revealed a spectrum consistent with proposed structure (5.61 g, 67.4%).

(f) Preparation of 6-[1,1-dimethyl-1-(fluorenyl)silyl]-5,6-dihydrido-2,5-dimethyl indeno[2,1-b]indolyldilithium 1-6. A 200-mL flask with side arm was charged with 1-5 (5.58 g, 12.3 mmol) and diethylether (150 mL). The mixture was placed under nitrogen and cooled to −78° C. n-Butyllithium (11.0 mL, 2.5 M, 27.5 mmol) was added by syringe, and the mixture turned yellow-orange and warmed to room temperature overnight. The volatiles were removed under vacuum and the residue was washed with hexanes and the solids filtered and dried (6.08 g, 99%).

(g) Preparation of 6-[1,1-dimethyl-1-(fluorenyl)silyl]-5,6-dihydrido-2,5-dimethyl indeno[2,1-b]indolylzirconium dichloride 1-7. A 250-mL flask was charged with zirconium tetrachloride (1.45 g, 6.22 mmol) and toluene (75 mL). Diethylether (25 mL) was added slowly to dissolve the zirconium tetrachloride, and the dianion 1-6 (2.91 g, 6.22 mmol) was added in portions over the course of 30 minutes. The mixture turned red and was stirred for 24 hours and filtered. The solid was washed with toluene (30 mL) followed by hexanes (30 mL) to afford 1-7 as a red-orange solid (2.93 g, 67.2%).

EXAMPLE 2

10-[1,1-Dimethyl-1-(fluorenyl)silyl]-5,10-dihydrido-5,8-dimethyl Indeno[1,2-b]indolylzirconium Dichloride 2-6

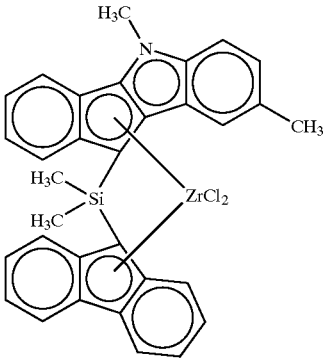

2-6

(a) Preparation of 8-methyl-5,10-dihydroindeno[1,2-b]indole 2-1 A 1-L 3-neck flask equipped with mechanical stirrer, reflux condenser, and glass stopper was charged with 1-indanone (46.1 g, 0.35 mol) and p-tolylhydrazine hydrochloride (55.5 g, 0.35 mol). Ethanol (550 mL) was added, and the mixture was heated to gentle reflux with vigorous stirring to afford an orange slurry. Concentrated hydrochloric acid (30 mL) was added, the mixture was heated to full reflux with stirring, and a precipitate formed within 10 minutes. The mixture was refluxed for 3 hours and cooled to room temperature. The slurry was filtered and washed with ethanol (300 mL), followed by 20% ethanol in water (400 mL) and hexanes (200 mL) to afford 2-1 as an off-white solid (63.3 g, 82.5%).

(b) Preparation of 5,8-dimethyl-5,10-dihydroindeno[1,2-b]indole 2-2 A 1-L 3-neck flask equipped with mechanical stirrer, reflux condenser, and dropping addition funnel was charged with sodium hydroxide (89.0 g, 2.22 mol) dissolved in water (112 mL) and hexadecyltrimethylammonium bromide (0.65 g, 1.8 mmol) as a phase transfer catalyst. Compound 2-1 (36.5 g, 0.17 mol) was added followed by toluene (112 mL) with vigorous stirring. Methyl iodide (17.0 mL, 0.27 mol) in toluene (15 mL) was added dropwise, and the mixture turned pale beige and was heated to reflux for 3 hours and cooled to room temperature. The mixture was filtered to afford a pale yellow crystalline solid. The filtrate was separated, the aqueous layer washed with toluene (2×100 mL), and the organic layers were combined, dried over sodium sulfate, filtered, and concentrated until a solid formed, which was washed with chilled (−78° C.) ethanol (200 mL) and hexanes (100 mL) to afford a yellow solid. NMR revealed that both the crystalline material (17.0 g) and the precipitated solid (8.8 g) were compound 2-2 (total: 25.8 g, combined yield: 66.3%)

(c) Preparation of 5,8-dimethyl-5,10-dihydroindeno[1,2-b]indol-10-yllithium 2-3 A 500-mL flask equipped with stir bar was charged with 2-2 (14.22 g, 60.94 mmol) and dissolved in toluene (175 mL) to afford an orange solution. n-Butyl lithium (38.0 mL, 2.5 M in hexanes, 95.0 mmol)

was added by syringe under vigorous stirring at room temperature, and the solution turned red. A precipitate formed after 1 hour, and the mixture was maintained overnight and filtered and washed with toluene (100 mL). The yellow-orange solid was dried under vacuum (14.2 g, 97.1%).

(d) Reaction of 2-3 with 1-1 A solution of 2-3 (4.90 g, 20.5 mmol) in toluene (150 mL) and diethylether (approximately 50 mL) was added at room temperature to a solution of 1-1 (5.30 g, 20.5 mmol) in diethylether (approximately 50 mL). The mixture turned deep yellow orange and cloudy and was maintained at room temperature for 2 days. The crude mixture was washed with water (4×100 mL), and the layers were separated. The aqueous layer was washed with diethylether (3×100 mL) and the organics were combined and dried over sodium sulfate. The mixture was filtered and the volatiles were removed under reduced pressure to afford a crystalline solid, which was washed with hexanes (100 mL) followed by chilled acetone (−30° C., 200 mL) and dried under vacuum to yield 2-4 as an off-white solid (3.00 g, 32.0%).

(e) Preparation of 6-[1,1-Dimethyl-1-(fluorenyl)silyl]-5,10-dihydrido-5,8-dimethyl indeno[1,2-b]indolylzirconium dichloride 2-6 Product 2-4 (7.90 g, 17.3 mmol) was dissolved in diethylether (130 mL) and cooled to −78° C. n-Butyllithium (15.0 mL, 2.5 M in hexanes, 37.5 mmol) was added by syringe under nitrogen purge, and the mixture was allowed to warm to room temperature overnight. The volatiles were removed under vacuum, and to solid dianion 2-5 was dried (7.99 g, 99%). A flask was charged with zirconium tetrachloride (0.63 g, 2.68 mmol) and toluene (100 mL) and diethylether (25 mL). The dianion 2-5 (1.25 g, 2.67 mmol) was added as a solid over the course of 25 minutes, and the mixture immediately turned pink-red and finally purple. The mixture was maintained at room temperature overnight and filtered. The red-purple solid was washed with toluene (approximately 10 mL) followed by hexanes (approximately 20 mL) and was dried under vacuum to afford 2-6 (0.70 g, 42.5%).

EXAMPLE 3

10-[2-(Fluorenyl)ethyl]-5,10-dihydrido-5,8-dimethyl Indeno[1,2-b]indolylzirconium Dichloride 3-3

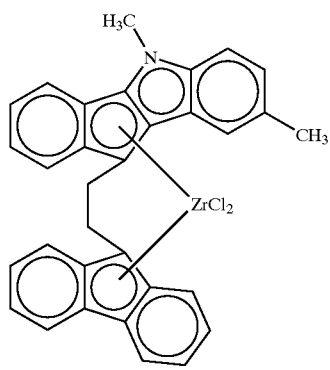

3-3

(a) Alkylation of fluorene to prepare 3-1 A solution of n-butyllithium (5.3 mL, 2.5 M in hexanes, 13.3 mmol) was added slowly to a solution of fluorene (1.97 g, 11.8 mmol) in diethylether (125 mL) at room temperature, and the orange mixture was maintained overnight. The fluorenyl anion was added dropwise to a solution of 1,2-dibromoethane (10.2 mL, 118.4 mmol) in diethylether (70 mL) at room temperature, and the mixture was maintained overnight. The volatiles were removed under vacuum, and the residue was washed with hexanes, filtered, and dried (2.63 g, 61.8%).

(b) Preparation of 3-2 from the reaction of 3-1 with 2-3 A solution of 2-3 (2.64 g, 11.0 mmol) in toluene (75 mL) and tetrahydrofuran (10 mL) was added at room temperature to a solution of 3-1 (3.01 g, 11.0 mmol) in tetrahydrofuran (100 mL). A precipitate formed after 5 minutes, and the mixture turned pale red and was maintained for 48 hours and filtered. The mixture was poured into water (100 mL), and diethylether (50 mL) was added, and the layers were separated. Methylene chloride (1 L) was added, and the organics were dried over sodium sulfate and filtered. The volatiles were removed under vacuum to afford 3-2 as a solid, which was washed with chilled (−78° C.) hexanes and dried (2.90 g, 62.1%).

(c) Preparation of 10-[2-(fluorenyl)ethyl]-5,10-dihydrido-5,8-dimethyl indeno[1,2-b]indolylzirconium dichloride 3-3 A slurry of 3-2 (2.38 g, 5.60 mmol) in diethylether (170 mL) was cooled to −78° C., and n-butyllithium (5.0 mL, 2.5 M, 12.5 mmol) was added under nitrogen, and the mixture was allowed to warm to room temperature overnight. The volatiles were removed under vacuum to afford a yellow-orange solid, which was washed with diethylether (50 mL) and dried (1.39 g, 3.18 mmol, 57.1%). The dianion was added as a solid to zirconium tetrachloride (0.74 g, 3.20 mmol) in toluene (100 mL) and diethylether (20 mL). The mixture turned red and was maintained overnight and filtered. The solid was washed with diethylether (20 mL) and dried under vacuum (0.97 g, 45.4%).

EXAMPLE 4

10-[1,1-Dimethyl-1-(fluorenyl)silyl]-5,10-dihydrido-2-chloro-5-phenyl Indeno[1,2-b]indolylzirconium Dichloride 4

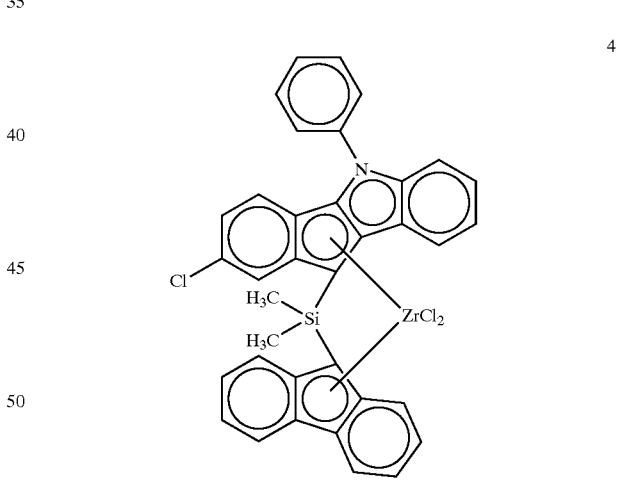

4

(a) Preparation of 2-chloro-5-phenyl-5,10-dihydroindeno[1,2-b]indole 4-1 In a 100-mL round bottom flask, 50 mL ethanol, 4 mL $H_2SO_4$, 5.09 grams 5-chloro-1-indanone (0.0306 moles) and 6.74 grams N,N-diphenylhydrazine hydrochloride (0.0306 moles) were mixed and heated to reflux for 4 hours. A brown solid was isolated upon cooling from the reaction mixture and recrystallized from ethanol to yield 7.55 grams of the indenoindole product 4-1 (72% yield).

(b) Preparation of 2-chloro-5-phenyl-5,10-dihydroindeno[1,2-b]indol-10-yllithium 4-2 Under a dry nitrogen atmosphere, 2.37 grams (0.0075 moles) of 2-chloro-5-phenyl-5,10-dihydroindeno[1,2-b]indole was slurried in 40 mL of hexane. To the slurry was added 5.6 mL of a 2.0 M solution of n-butyllithium in cyclohexane. The mixture was stirred at room temperature under a nitrogen atmosphere for 67 hours. The resulting yellow solid was filtered, washed with hexane and dried under vacuum (1.8 grams, 67% yield).

(c) Reaction of 4-2 with 1-1 A solution of 1-1 (0.362 g, 1.4 mmol) in diethylether (20 mL) was slowly added at room temperature to a solution of the lithium salt 4-2 (0.45 g, 1.4 mmol) in a mixture of toluene (8 mL) and diethylether (20 mL). The mixture was stirred at room temperature for 16 hours. The crude mixture was poured into 100 ml of water and ice and the layers separated. The aqueous layer was washed with diethylether (3×100 mL) and the ether fractions were combined and dried over magnesium to sulfate. The mixture was filtered and the volatiles were removed under reduced pressure to give a crystalline solid, which was washed three times with 20 mL of hexane and dried under vacuum to yield 4-3 as an off-white solid (0.26 g, 34%).

(d) Preparation of 10-[1,1,-dimethyl-1-(fluorenyl)silyl]-5,10-dihydrido-2-chloro-5-phenyl indeno[1,2-b]indolylzirconium dichloride 44 Product 4-3 (0.27 g, 0.5 mmol) was dissolved in diethylether (20 mL). n-Butyllithium (0.63 mL, 1.6 M in hexane, 1.0 mmol) was added by syringe under nitrogen purge. The mixture was stirred for 2 hours and allowed stand at room temperature overnight. Separately, a flask was charged with zirconium tetrachloride (0.12 g, 1.0 mmol), toluene (5 mL) and diethylether (30 mL). The dianion solution was added to the $ZrCl_4$ suspension and the mixture immediately turned pink-red and finally red-purple. The mixture was maintained at room temperature for 24 hours and filtered. The red-purple solid was washed with diethylether until the filtrate was colorless. The resulting purple solids were then dried under vacuum (0.21 g, 54%).

EXAMPLE 5

A solution of catalyst precursor and activator was prepared in an inert atmosphere dry box by mixing 5 mg of catalyst precursor from Example 1 with 2.2 mL of MAO (10% by weight solution of methylalumoxane in toluene) and 7.8 mL of toluene. This solution was allowed to age for 30 minutes before adding to the polymerization reactor.

To a 1-L stainless-steel stirred reactor, at room temperature, was charged 400 mL of dry, oxygen-free propylene. Then 1.6 mL of a 25% by weight solution of triisobutylaluminum in heptane was flushed into the reactor with 50 mL of isobutane. The reactor was brought to 25° C. and allowed to equilibrate. Polymerization was then begun by adding 1.0 mL of the solution of catalyst precursor and activator and by flushing with 50 mL of isobutane. After 60 minutes of polymerization, the reactor was vented to is remove the remaining propylene and isobutane. The polymer was removed from the reactor, soaked overnight in 1 L of methanol, filtered, and dried. The activity was calculated to be 1138 kg polypropylene per g zirconium metal per hour. The weight average molecular weight was determined by GPC to be 333,000. Analysis by $^{13}C$ nuclear magnetic resonance spectroscopy revealed 4% mmmm and 14% rrrr pentads.

EXAMPLES 6–13

Examples 6–13 were run in similar fashion as Example 5, but varying in the choice of catalyst precursor and the temperature. Example 9 is a repeat of Example 8, but with 0.8 mL of the 25% by weight solution of triisobutylaluminum in heptane. The conditions and results are listed in Table 1.

TABLE 1

| | | Propylene Polymerization with MAO | | | | | |
|---|---|---|---|---|---|---|---|
| Example | Catalyst Precursor | Polymerization Temperature ° C. | Activity | $M_w$/1000 | $M_w/M_n$ | % mmmm | % rrrr |
| 5 | 1 | 25 | 1138 | 333 | 2.8 | 4 | 14 |
| 6 | 2 | 25 | 297 | 1,100 | 4.4 | 2 | 16 |
| 7 | 1 | 50 | 841 | 193 | 3.2 | 4 | 14 |
| 8 | 2 | 50 | 873 | 440 | 5.7 | 2 | 16 |
| 9 | 2 | 50 | 650 | 373 | 4.6 | 2 | 16 |
| 10 | 4 | 50 | 456 | 465 | 2.6 | 3 | 13 |
| 11 | 1 | 70 | 471 | 66 | 4.1 | 4 | 14 |
| 12 | 2 | 70 | 350 | 119 | 5.7 | 3 | 16 |
| 13 | 4 | 70 | 197 | 135 | 3.6 | 4 | 14 |

Each of the polymerizations in Examples 5–13 resulted in polypropylene with high molecular weight and the desired tacticity, demonstrating that the process is useful over a range of conditions. The examples also demonstrate that generally molecular weight decreases with increasing polymerization temperature, but that the process is robust over a wide temperature range.

EXAMPLE 14

A solution of catalyst and activator was prepared in an inert atmosphere dry box by mixing 5 mg of catalyst precursor from Example 1 with 12 mg tetrakis(pentafluorophenyl)borate, 1.5 mL triisobutylaluminum (25% by weight in heptane) and 8.5 mL of toluene. This solution was used in the polymerization experiments after being allowed to age for 30 minutes before adding to the polymerization reactor.

To a 1-L stainless-steel stirred reactor, at room temperature, was charged 400 mL of dry, oxygen-free propylene. Then 0.8 mL of a 25% by weight solution of triisobutylaluminum in heptane was flushed into the reactor with 50 mL of isobutane. The reactor was brought to the desired polymerization temperature and allowed to equilibrate. Polymerization was then begun by adding 1.0 mL of the solution of catalyst precursor and activator and by flushing with 50 mL of isobutane. After 60 minutes of polymerization, the reactor was vented to remove the remaining propylene and isobutane. The polymer was removed from the reactor, soaked overnight in 1 L of methanol, filtered, and dried.

EXAMPLES 15–23

Examples 15–23 were run in similar fashion as Example 14, but varied in the choice of catalyst precursor and the temperature. Examples 17 and 18 are duplicate runs. The conditions and results are listed in Table 2.

TABLE 2

Propylene Polymerization with Triisobutylaluminum

| Example | Catalyst Precursor | Polymerization Temperature °C. | Activity | $M_w/1000$ | $M_w/M_n$ | % mmmm | % rrrr |
|---|---|---|---|---|---|---|---|
| 14 | 1 | 25 | 387 | 231 | 2.5 | 3 | 15 |
| 15 | 2 | 25 | 554 | 1,500 | 3.8 | 2 | 20 |
| 16 | 1 | 50 | 184 | 154 | 3.1 | 3 | 12 |
| 17 | 2 | 50 | 672 | 640 | 4.0 | 2 | 17 |
| 18 | 2 | 50 | 682 | 574 | 2.4 | 2 | 17 |
| 19 | 3 | 50 | 805 | 118 | 4.5 | 7 | 11 |
| 20 | 4 | 50 | 738 | 733 | 5.6 | 2 | 15 |
| 21 | 1 | 70 | 96 | 68 | 3.5 | 3 | 16 |
| 22 | 2 | 70 | 450 | 208 | 5.7 | 2 | 17 |
| 23 | 4 | 70 | 215 | 214 | 4.1 | 3 | 15 |

Each of the polymerizations in Examples 14–23 resulted in polypropylene with high molecular weight and the desired tacticity, demonstrating that the process is useful with a different activator system.

Each of the polymerizations in Examples 5–23 resulted in amorphous, transparent, very flexible polymers with good elastic properties, which improve with increasing molecular weight. Some of the polymers were molded into ASTM type I tensile bars and the properties measured. The tensile set at 300% elongation was measured by extending the sample to 300% of the original length, immediately releasing the sample and measuring the set after ten minutes. A set of 0% indicates complete return to the original length while 200% would indicate no return from the elongated position. The tensile set at 200% was measured by extending the sample to 200% of the original length and holding the sample for ten minutes, followed by releasing the sample and then measuring the set after another ten minutes. A set of 0% indicates complete return to the original length while 100% would indicate no return from the elongated position. The stress recovery is the decrease in sample stress at 200% elongation after ten minutes. The results are listed in Table 3.

TABLE 3

Tensile Properties

| Polymer Example | $M_w/1000$ | Tensile Strength at Break (MPa) | % Elongation at Break | Tensile Set after 300% Elongation % | Tensile Set after 200% Elongation % | Stress Recovery % |
|---|---|---|---|---|---|---|
| 15 | 154 | — | | 7 | 47 | 58 |
| 7 | 193 | — | | 5 | 36 | 57 |
| 9 | 373 | — | | 4 | 24 | 51 |
| 16 | 640 | 2.24 | 500 | 0 | 10 | 28 |
| 9 | 465 | 2.65 | 800 | 1 | 14 | 42 |
| 19 | 733 | 3.07 | 510 | 0 | 8 | 28 |

These properties, particularly the low % tensile sets, demonstrate the excellent elastic properties of the polymers made by this process.

The preceding examples are meant only as illustrations. The following claims define the invention.

We claim:

1. A process which comprises polymerizing propylene with a fluorenyl-indenoindolyl catalyst precursor in the presence of an activator to produce polypropylene having $M_w$ greater than 65,000 and having tacticity such that mmmm is 0–20% and rrrr is 0–60%.

2. The process of claim 1 wherein the catalyst precursor is a Group 4 transition metal catalyst precursor.

3. The process of claim 1 wherein the activator is selected from the group consisting of alumoxanes, alkylaluminum compounds, organoboranes, ionic borates, ionic aluminates, aluminoboronates and mixtures thereof.

4. The process of claim 1 wherein the catalyst precursor is premixed with a solution of the activator.

5. The process of claim 4 wherein the catalyst precursor and activator solution are premixed for 10 to 120 minutes.

6. The process of claim 4 wherein a portion of the activator is premixed with the catalyst precursor and a portion is added directly to the reactor prior to the addition of the premix.

7. The process of claim 1 wherein polypropylene has tacticity such that mmmm is 2–10% and rrrr is 10–25%.

8. The process of claim 1 wherein the polypropylene has $M_w$ greater than 100,000.

9. The process of claim 1 wherein the catalyst precursor has the structure:

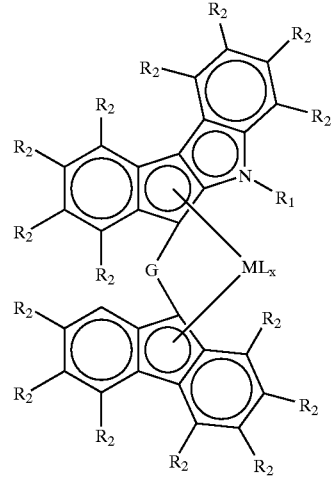

in which $R_1$ is selected from the group consisting of $C_1$–$C_{30}$ hydrocarbyl, $C_1$–$C_6$ halocarbyl, $C_1$–$C_{30}$ halohydrocarbyl and trialkylsilyl; each $R_2$ is independently selected from the group consisting of $R_1$, H, F, Cl, Br and $C_1$–$C_6$ alkoxy; G is a divalent radical selected from the group consisting of hydrocarbyl and heteroatom containing alkylene radicals, diorgano silyl radicals, diorgano germanium radicals and diorgano tin radicals; M is a Group 3 to 10 transition metal; each L is independently selected from the group consisting of halide, alkoxy, siloxy, alkylamino, and $C_1$–$C_{30}$ hydrocarbyl and x satisfies the valence of M.

10. The process of claim 9 wherein the catalyst precursor has the structure:

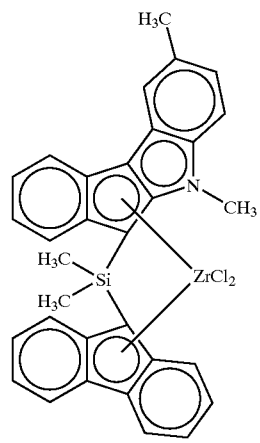

11. The process of claim 1 wherein the catalyst precursor has the structure:

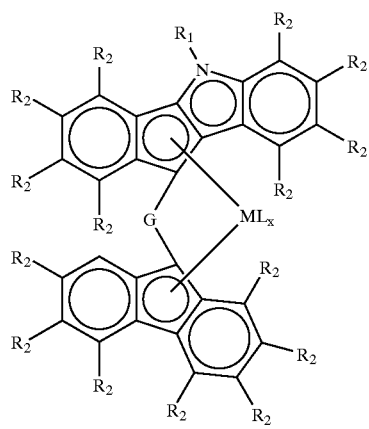

in which $R_1$ is selected from the group consisting of $C_1$–$C_{30}$ hydrocarbyl, $C_1$–$C_6$ halocarbyl, $C_1$–$C_{30}$ halohydrocarbyl and trialkylsilyl; each $R_2$ is independently selected from the group consisting of $R_1$, H, F, Cl, Br and $C_1$–$C_6$ alkoxy; G is a divalent radical selected from the group consisting of hydrocarbyl and heteroatom containing alkylene radicals, diorgano silyl radicals, diorgano germanium radicals and diorgano tin radicals; M is a Group 3 to 10 transition metal; each L is independently selected from the group consisting of halide, alkoxy, siloxy, alkylamino, and $C_1$–$C_{30}$ hydrocarbyl and x satisfies the valence of M.

12. The process of claim 11 wherein the catalyst precursor has the structure:

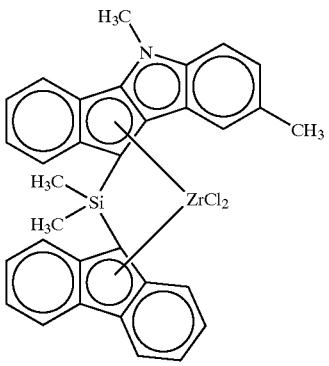

13. The process of claim 11 wherein the catalyst precursor has the structure:

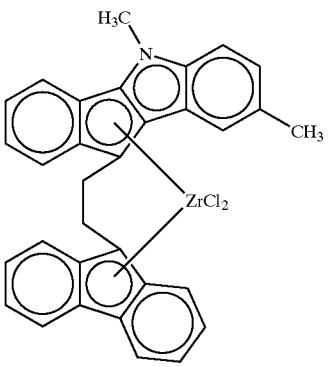

14. The process of claim 11 wherein the catalyst precursor has the structure:

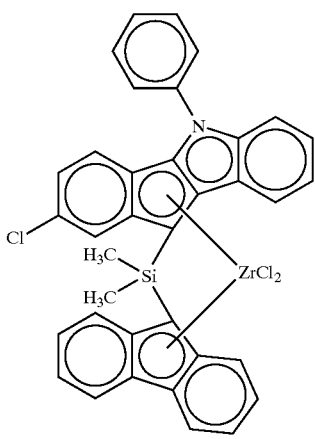

15. The process of claim 1 wherein the polymerization is performed at a temperature within the range of about 20° C. to about 70° C.

16. A slurry polymerization process of claim 1.

17. A gas-phase polymerization process of claim 1.

18. A process which comprises polymerizing propylene with a fluorenyl-indenoindolyl catalyst precursor in the presence of an activator to produce polypropylene having $M_w$ greater than 65,000 and having tacticity such that mmmm is 0–20% and rrrr is 0–60% wherein the catalyst activity is greater than 100 kg polypropylene per gram transition metal per hour.

19. The process of claim 18 wherein the activity is greater than 200 kg polypropylene per gram transition metal per hour.

20. The process of claim 19 wherein the activity is greater than 400 kg polypropylene per gram transition metal per hour.

* * * * *